INVENTOR.
Samuel C. Carter

Patented Nov. 13, 1945

2,388,827

UNITED STATES PATENT OFFICE 2,388,827

PLUG VALVE

Samuel C. Carter, Los Angeles, Calif.

Application August 17, 1943, Serial No. 498,912

17 Claims. (Cl. 251—103)

This invention relates to a valve and has particular reference to a plug valve, it being an object of the invention to provide an improved and simplified construction for handling the packing in a valve of this character.

It is highly desirable in many plug valves to provide packing between the plug and the body which carries the plug. A metallic type of packing is practical for most purposes, it being found that a packing of soft metal particles, particles of resilient material such as rubber, and a suitable lubricant forms an excellent seal when confined to a narrow or thin body at the point of packing.

In practice considerable difficulty has been experienced in providing a construction for effectively handling such packing in the most advantageous manner. The packing must be fed to the point at which it operates and considerable pressure is necessary to effect the necessary feeding action. For practical and efficient operation the packing should be handled by passages which are fairly large and which provide a direct course, otherwise there is an excess of friction and the packing may not be fed properly, due to a tendency for the metal particles to flock.

It is an object of this invention to provide a plug valve having a minimum number of simple parts which operate to establish a narrow body of packing around each end of the plug and packing carrying openings which are effective and efficient.

Another object of this invention is to provide a plug valve of the character mentioned in which the parts are simple in design and such that they can be very easily and economically finished and assembled.

Another object of this invention is to provide a plug valve construction of the character mentioned in which the plug is provided at each end with a stem and the packing is introduced to the plug through the stems.

A further object of the present invention is to provide a plug valve of the character mentioned in which the packing is introduced through the stems of the plug in a manner to effect packing around the stems and also supply packing to the seals around the plug.

Figure 1:
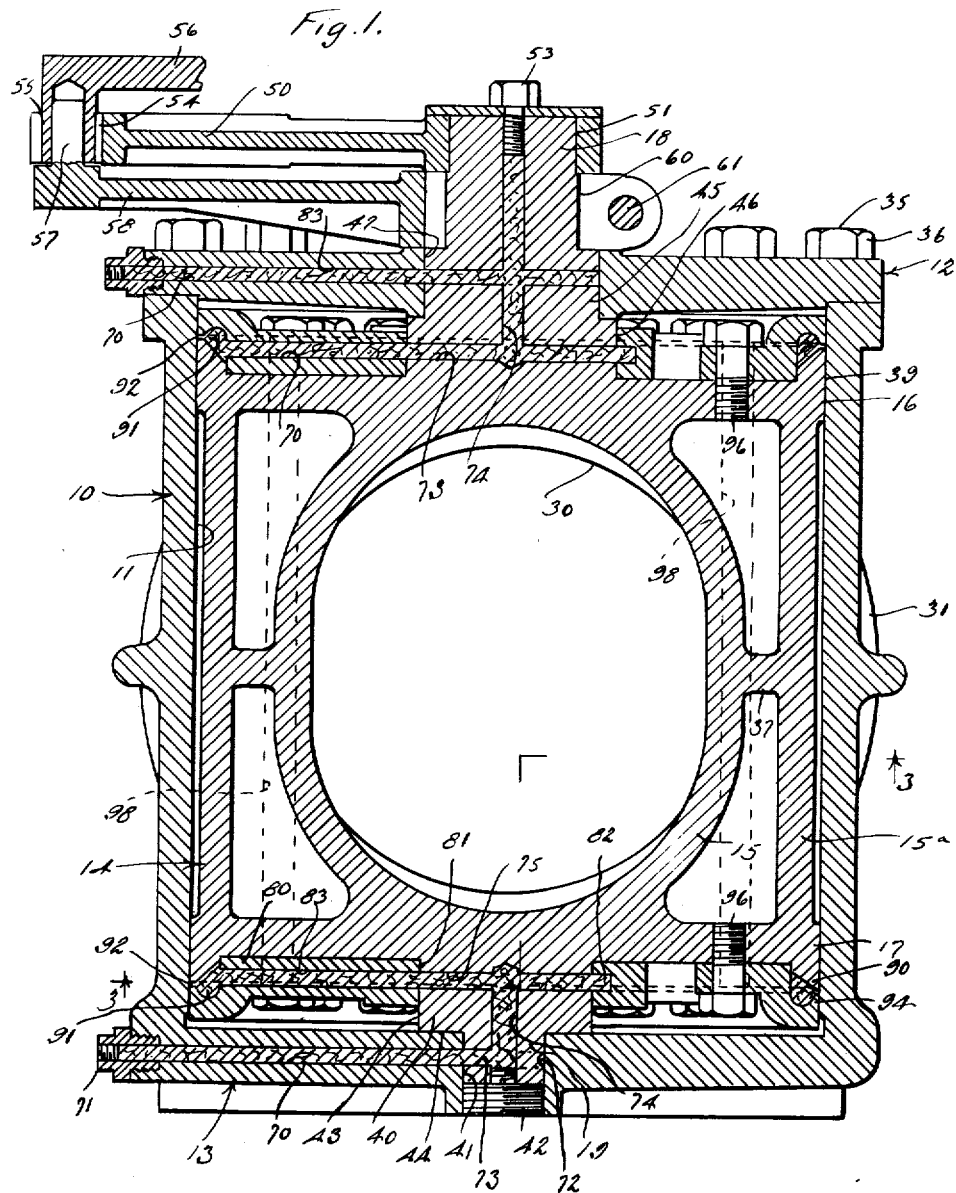
Figure 2:
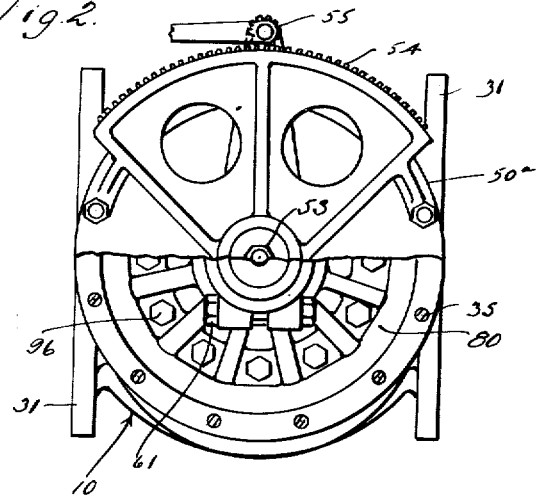
Figure 3:
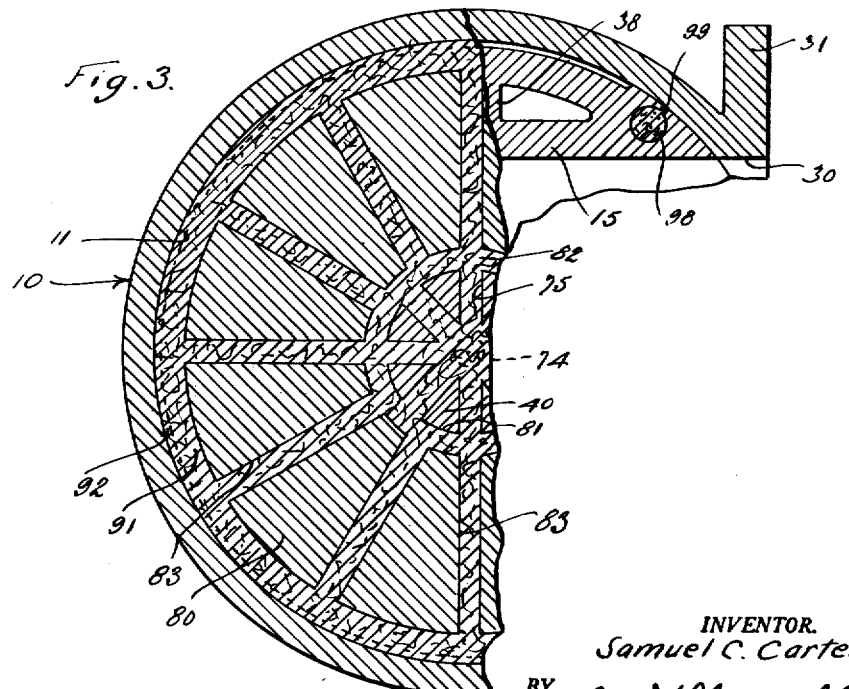

The various objects and features of my invention will be fully understood from the following detailed description of a typical preferred form and application of the invention, throughout which description reference is made to the accompanying drawings, in which:

Fig. 1 is a vertical detailed sectional view of a typical plug valve embodying the present invention. Fig. 2 is a reduced plan view of the valve and Fig. 3 is a reduced detailed sectional view of the valve taken substantially as indicated by line 3—3 on Fig. 1.

Since the present invention is concerned primarily with a construction for effectively handling packing in a plug valve I have illustrated a typical valve of this type in which there is a cylindrical body and a plug rotatable therein. It is to be understood, of course, that the invention may be applied to plug valves in which the parts are tapered or otherwise shaped and that the broader features of the invention are not to be considered as limited to the specific form of valve illustrated.

The valve provided by the present invention comprises, generally, a body 10 shown in the drawings as having a cylindrical bore 11, an upper head 12 closing the upper end of the body, a lower head 13 closing the lower end of the body, a plug 14 rotatable in the bore of the body and having a cylindrical body portion 15$^a$, a transverse tubular part 15 extending through the body portion for conducting fluid and having an upper end flange 16 slidably fitting the bore of the body and a lower end flange 17 slidably fitting the bore of the body, and a stem at each end of the plug 14. The stem 18 at the upper end of the body is an operating stem and the stem 19 at the lower end of the body is a guide stem.

The heads 12 and 13 and the stems 18 and 19 are ported so that packing can be introduced into the interior of the body adjacent the flanges 16 and 17 and in accordance with my invention a packing plate is applied to each flange of the body to serve as a conductor for carrying packing to the peripheral portion of the body where the plates cooperate with the flanges to define a narrow annular opening where the packing is exposed to engage with the bore 11 and effect a seal.

The body 10 may, in practice, be in the nature of a casting shaped to have a cylindrical bore 11 of the desired size and length to properly accommodate the other parts of the structure. Diametrically opposite openings 30 are provided in the sides of the body intermediate the ends thereof to pass fluid handled by the valve, and means are provided at the outer ends of the openings 30 to connect the valve with other parts such as suitable fluid conduits. In the case illustrated the body is provided with coupling flanges 31 at the outer ends of the openings 30, the flanges being cast integral with the other parts of the body and being finished and proportioned to properly accommodate flanges on pipes, or the like. In the simple preferred form of the invention illustrated the bore 11 provided to accommodate the plug 14 is a straight cylindrical bore extending vertically through the body from one end to the other.

The heads 12 and 13 are provided to close the ends of the body 10. In practice both heads may be removable. However, in most cases it is desirable to form one of the heads integrally with the body as this simplifies the construction and the number of parts involved. In the case illustrated the head 13 is shown formed integral with the body so that it acts as a closure for the lower end of the body.

The head 12 at the upper end of the body is made detachable or removable to facilitate the introduction of the plug into the body or its removal when that is necessary for repair or replacement. The head 12 is shaped to correspond to the upper end portion of the body 10 and may be secured thereto in any suitable manner. In the case illustrated studs 35 project from the upper end of the body through suitable openings in the head 12 and nuts 36 are applied to the studs to retain the head on the body.

The tubular part 15 through the body of the plug forms a fluid conduit designed to carry fluid through the body from one opening 30 to the other when the plug is in operating position with the part 15 in alignment with the openings 30. The plug of course can be turned out of that position or to a position where the tubular part 15 is transverse of the axis of the openings 30, in which case the valve is closed against the passage of fluid. The tubular part 15 is finished at either end so that its ends are curved concentric with the bore 12 and to slidably fit the bore 12 in the manner common to plug valve construction. In the case illustrated the valve is of fairly large dimensions, in which case the tubular part 15 is provided with suitable reinforcing ribs 37 and also with reinforcing ribs 38. The ribs 37 and 38 are provided to stiffen the plug generally, the ribs 37 being formed in a direction transverse of the axis of the valve, whereas the ribs 38 extend longitudinally of the plug joining the flanges 16 and 17 and also the tubular part 15.

The flanges 16 and 17 provided at the upper and lower ends of the plug, respectively, are alike, each being in the form of a disc having its outer periphery 39 finished to slidably fit the bore 11 of the body 10. The flanges are preferably cast or formed integrally with the body portion 15ª and tubular part 15 of the plug, as shown in the drawings.

In accordance with my invention packing is introduced to each end of the plug through a stem on the end of the plug. So far as the handling of packing is concerned the stems on the ends of the plug function alike. However, in practice the stems may vary in construction between the two ends of the structure. For instance, the stem 18 at the upper end may be in the nature of an operating stem employed for rotating the plug 14 while the stem 19 at the lower end of the plug may serve merely as a guide for the lower end of the plug. The stem 19 at the lower end of the plug is joined with the lower flange 17 of the plug through a boss or hub 40. The stem 19 is turned concentric with the axis about which the plug rotates and slidably fits a socket 41 provided in the lower head 13. In practice the socket 41 may be formed in the head 13 by providing a central bore through the head which bore is closed at its lower end by a plug 42. The hub 40 is considerably larger in diameter than the stem 19 and has its periphery 43 turned concentric with the stem 19 and the axis of the plug 14. The hub 40 presents an end face 44 which slidably engages the inner side of the head 13.

There is a corresponding construction at the upper end of the valve where the stem 19 is joined with the upper plug flange 16 through a boss 45. The boss 45 has its outer or peripheral portion 46 turned concentric with the axis of the plug 14 while its end is finished to slidably fit the inner side of the head 12.

The operating stem 18 is somewhat smaller in diameter than the hub 45 and slidably fits an opening 47 provided centrally through the head 12. The upper end construction differs from the lower end construction in that the stem 18 does not terminate in the opening 47 but rather projects above the plate 12 where it is engaged by means for operating it.

In practice any suitable means may be provided for operating the plug through the stem 18. In the case illustrated a gear segment 50 is fixed to the head 12 through brackets 50ª. The segment has a central hub part carried on the turned end 51 of the stem where it is retained by a plate held by a screw 53.

An operating arm 58 is fixed on the stem 18, for instance it may be clamped on a squared part 60 formed on the stem, the clamping being effected through a screw 61. A pivot pin 57 is carried by the outer end of the arm immediately beyond the series of teeth 54 of the gear segment. An operating pinion 55 is carried on the pin 57 and is adapted to be rotated by means of an operating lever 56, or the like.

With the construction just described the gear segment 50 being fixed relative to the head 12 when the pinion 55 is rotated, the arm 58 is operated or swung so that the plug 14 connected to the arm through the stem 18 is likewise turned or swung.

In accordance with the present invention packing of a suitable nature, for instance, a packing composed of particles of soft metal, such as lead, particles of a resilient or live material such as rubber, neoprene, etc., and a suitable lubricant, is supplied to the ends of the plug in narrow bodies to pack with the bore 11 of the body 10 and the packing is fed from the exterior of the structure. The construction provided by the invention may be the same at the two ends of the valve, except for slight variations in proportioning made necessary by variations in the other parts of the valve at the two ends. I will for example describe the invention as it is applied to the lower end portion of the valve, it being understood that this description applies equally well to the parts at the upper end.

A feed duct 70 for packing is provided in the head 13 to conduct packing from a suitable point at the exterior of the valve to the stem 19. In the case illustrated the feed duct is formed radially through the head 13 and at its outer end or at the peripheral portion of the head 13 the duct is provided with a suitable fitting 71 through which packing may be introduced under pressure. In practice any suitable means may be provided for connection with the fitting 71 to intermittently supply packing, or a fixture may be applied which is permanent on the valve and which can be occasionally operated to exert pressure on the packing. The feed duct terminates at the socket 41 where it communicates with a groove 72 in the periphery of the plug 19. Radial ports 73 extend inwardly from the groove 72 to communicate with a central passage 74 which extends through the stem 19 and into the hub 40. A plurality of radial ports 75 join the central passage 74 and extend to the periphery of the hub 40.

Through the construction thus far described packing supplied through the fitting 71 is conducted by the feed duct 70 to the groove 72 from which it passes inwardly through the ports 73, then longitudinally of the structure through the passage 74 and then radially through the ports 75 to discharge at the periphery of the hub 40.

The present invention provides a packing plate 80 on the plug flange 17 to conduct the packing from the hub 40 to the periphery of the plug and to cooperate with the peripheral portion of the plug to define a narrow opening where the packing is active. The packing plate 80 has a central bore 81 which slidably fits over the periphery 43 of the hub 40. An annular groove 82 is provided in the bore 81 of the plate 80 to receive packing from the ports 75. A plurality of radial ports 83 extend through the plate 80 to its peripheral portion where they discharge the packing.

In accordance with my invention the peripheral portions of the flange 17 and the plate 81 cooperate to form an annular chamber 91 to carry a body of packing, which chamber has an opening 92 at the periphery of the plug so that packing is carried thereby to engage the bore 11. In practice either one or both of the parts, that is, the flange 17 and plate 80, may be specially formed to carry out the desired construction. In the case illustrated a lip 90 is formed on the flange 17 and a lip 94 is formed on the peripheral portion of the plate 80. The lips 90 and 94 are shaped and proportioned so that they form the necessary cavity or chamber 91 entirely around the peripheral portion of the structure. The lips 90 and 94 approach each other but do not join, the space between them forming the narrow opening or channel 92 for carrying the packing.

With the construction described packing received from the ports 75 is conducted from the groove 82 radially through the ports 83 to discharge into the annular chamber 91 from which it issues through the narrow groove or channel 92.

In practice the plate 80 may be varied considerably in design, it being preferred that it be a simple turned part and that it be secured in place on the flange 17 by means of cap screws 96, or the like.

It will be apparent from the foregoing description that I have provided a very simple and direct means of supplying packing from a point at the exterior of the structure to the peripheral portion of the plug where it is presented in a narrow, active strip which will effectively seal between the plug and the body. In practice the end portion of the plug can be readily turned to properly receive and accommodate the plate 80 and the plate 80 itself is a relatively simple part which is very easily formed.

The construction above described effectively seals above and below the port through the plug. To seal circumferentially at either side of the port I provide longitudinal ducts 98 in the plug communicating with the chamber 91 to receive packing therefrom. The ducts 98 have narrow channels 99 extending to the periphery of the plug so the packing is conducted to points to seal between plug and body.

Having described only a typical preferred form and application of my invention I do not wish to be limited or restricted to the specific details herein set forth, but wish to reserve to myself any variations or modifications that may appear to those skilled in the art or fall within the scope of the following claims.

Having described my invention, I claim:

1. A valve, including a body having a bore and fluid openings in its wall, heads closing the ends of the body, a plug of rigid material in the body between the heads, each end of the plug at the wall of the bore having a narrow circumferential packing carrying channel fixed as to size and shape and having substantially flat parallel side walls and each end of the plug having a packing carrying chamber adjacent and in communication with the channel therein and of substantially greater capacity than the channel, the channel forming a restricted outlet for material from the chamber to the exterior of the plug, there being ports in the stem and plug to conduct packing from the exterior of the body to the chambers.

2. A valve including a body having a bore and fluid openings in its wall, heads closing the ends of the body, a plug in the body between the heads, the ends of the plug at the wall of the bore having narrow channels carrying packing, and a part projecting from each end of the plug, there being packing carrying ports in the heads extending to said parts, passages in said parts extending to the plug and receiving packing from said ports, and ports in the plug receiving packing from said passages and delivering it to the channels.

3. A valve including a body having a bore and fluid openings in its wall, heads closing the ends of the body, a plug in the body between the heads, the ends of the plug at the wall of the bore having narrow channels carrying packing, a boss on each end of the plug, a stem projecting from each boss, there being ports in the heads for conducting packing to the stems and openings in the bosses and stems receiving packing from the ports, and means receiving packing from the bosses and conducting it to the channels.

4. A valve including a body having a bore and fluid openings in its wall, heads closing the ends of the body, a plug in the body between the heads, the ends of the plug at the wall of the bore having narrow channels carrying packing, a boss on each end of the plug, the bosses engaging the heads to hold the plug against movement endwise, a stem projecting from each boss, there being ports in the heads for conducting packing from the exterior thereof to the stems and openings in the bosses and stems receiving packing from the ports, and means receiving packing from the bosses and conducting it to the channels, one stem projecting through and beyond one head to provide means for operating the plug.

5. A valve including a body having a bore and fluid openings in its wall, heads closing the ends of the body, one of the heads being detachable from the body and having an opening through it and the other having a socket in it, a plug in the body between the heads, the ends of the plug at the wall of the bore having narrow channels carrying packing, a boss on each end of the plug, the bosses engaging the heads to hold the plug against movement endwise, a stem projecting from each boss, one through the opening and the other into the socket, there being ports in the heads for conducting packing to the stems and openings in the bosses and stems receiving packing from the ports, and means receiving packing from the bosses and conducting it to the channels, the stem projecting through the opening and extending beyond the head which has the opening to provide means for operating the plug.

6. A valve including a body having a bore and fluid openings in its wall, heads closing the ends of the body, a plug in the body between the heads, the ends of the plug at the wall of the bore having narrow channels carrying packing, a boss on each end of the plug, a stem projecting from each boss, there being ports in the heads for conducting packing to the stems and openings in the bosses and stems receiving packing from the ports, and means receiving packing from the bosses and conducting it to the channels, said means including a member attached to each end of the plug.

7. A valve including a body having a bore and fluid openings in its wall, heads closing the ends of the body, a plug in the body between the heads having a part for conducting fluid and being turned at each end to fit the bore of the body, projections at the ends of the plug, the heads having ports conducting packing to the projections, and a plate attached to each end of the plug, each plate having a part spaced from the plug to form a narrow packing carrying channel exposed to the bore of the body and having an opening receiving packing from the projection and conducting it to the channel.

8. A valve including a body having a bore and fluid openings in its wall, heads closing the ends of the body, a plug in the body between the heads having a part for conducting fluid and being turned at each end to fit the bore of the body, a plate attached to each end of the plug, each plate having a part cooperating with the end of the plug to which it is attached to form an annular packing carrying chamber of substantial capacity in the plug near its periphery and a narrow packing carrying channel communicating with the chamber and exposed to the bore, and means for supplying packing to said chambers.

9. A valve including a body having a bore and fluid openings in its wall, heads closing the ends of the body, a plug in the body between the heads having a part for conducting fluid and being turned at each end to fit the bore of the body, a plate attached to each end of the plug, each plate cooperating with the end of the plug to which it is attached to form an annular packing carrying chamber of substantial capacity in the plug near its periphery and having a lip cooperating with the plug to form a narrow packing carrying channel at the exterior of the plug communicating with the chamber and exposed to the bore and means for supplying packing to the chambers.

10. A valve including a body having a bore and fluid openings in its wall, heads closing the ends of the body, a plug in the body between the heads having a part for conducting fluid and being turned at each end to fit the bore of the body, a plate attached to each end of the plug, each plate having a part spaced from the end of the plug to which it is attached to form an annular packing carrying chamber of substantial capacity in the plug near its periphery, the plug having lips cooperating with the plates to form narrow packing carrying channels at the periphery of the plug communicating with the chambers and exposed to the bore and means for supplying packing to the chambers.

11. A valve including a body having a bore and fluid openings in its wall, heads closing the ends of the body, a plug in the body between the heads having a part for conducting fluid and being turned at each end to fit the bore of the body, a plate attached to each end of the plug, each plate having a part cooperating with the end of the plug to which it is attached to form an annular packing carrying chamber of substantial capacity in the plug near its periphery, lips on the body and on the plates forming narrow channels communicating with the chambers and exposed to the bore of the body and means for supplying packing to the chambers.

12. A plug valve including, a body having a bore and fluid openings in the wall of the bore, heads closing the end of the body, a plug in the body rotatably fitting the bore and having a fluid passage cooperating with the openings to conduct fluid through the valve, a boss on the plug at one end, a stem projecting from the boss into an opening in the adjacent head, there being a port in said adjacent head conducting packing to the stem, there being openings in the stem and boss conducting packing from said head to the periphery of the boss, and a plate attached to said end of the plug conducting fluid from the boss to the periphery of the plug at the bore of the body.

13. A plug valve including, a body having a bore and fluid openings in the wall of the bore, heads closing the ends of the body, a plug in the body rotatably fitting the bore and having a fluid passage cooperating with the openings to conduct fluid through the valve, a boss on the plug at one end concentric with the plug, a stem projecting from the boss into an opening in the adjacent head, there being a port in said adjacent head conducting packing from the exterior of the head to the stem, there being openings in the stem and boss conducting packing from said head to the periphery of the boss, and a plate slidably fitting the boss and secured to said end of the plug to conduct packing from the boss to the periphery of the plug.

14. A plug valve including, a body having a bore and fluid openings in the wall of the bore, heads closing the ends of the body, a plug in the body rotatably fitting the bore and having a fluid passage cooperating with the openings to conduct fluid through the valve, a boss on the plug at one end concentric with the plug, a stem projecting from the boss concentric thereto and into an opening in the adjacent head, there being a port in said adjacent head conducting packing from the exterior of the head to the stem, there being openings in the stem and boss conducting packing from said head to the periphery of the boss, and a plate slidably fitting the boss and secured to said end of the plug and having an opening to conduct packing from the boss to the periphery of the plug, the plate having a part cooperating with the said end of the plug to form a narrow packing carrying channel at the periphery of the plug communicating with the opening and carrying packing so it is exposed to the bore of the body.

15. A valve including a body having a bore and fluid openings in its wall, heads closing the ends of the body, a plug in the body between the heads and having a lateral fluid passage, there being packing carrying channels in the exterior of the plug and an extension projecting from one end of the plug through one of the heads, there being a port in the said head extending from the exterior thereof to the extension and there being ports in the extension and plug connecting the first mentioned port with the channels.

16. A valve including a body having a bore and fluid openings in its wall, heads closing the ends of the body, one of the heads being detachable from the body, a plug in the body between the heads and having a lateral fluid passage, there being packing carrying channels in the exterior of the plug and an extension projecting from one end of the plug through the detachable head, there being a port in the said detachable head extending from the exterior thereof to the extension and there being ports in the extension and plug connecting the first mentioned port with the channels.

17. A valve including a body having a bore and fluid openings in its wall, heads closing the ends of the body, a plug in the body between the heads having a port for conducting fluid and having finished end parts fitting the bore of the body, end plates attached to the ends of the plug and each having a part spaced from the plug at the periphery thereof to form a narrow packing channel and one having a packing carrying opening communicating with the channel, one of the heads having an opening through it, and a stem on one end of the plug extending through the opening and having a passage communicating with the opening in said plate, the said head having a passage for conducting packing from the exterior thereof to the passage in the stem, there being a packing carrying channel in the plug connecting the channels formed by the plates.

SAMUEL C. CARTER.